United States Patent [19]
Vidal Sario

[11] 3,751,315
[45] Aug. 7, 1973

[54] METHOD FOR THE MANUFACTURE OF THERMALLY INSULATED SANDWICH TYPE BUILDING

[75] Inventor: Javier Vidal Sario, Pamplona (Navarra), Spain

[73] Assignee: Perfil En Frio, S.A., Pamplona, Spain

[22] Filed: Mar. 31, 1970

[21] Appl. No.: 24,128

[30] Foreign Application Priority Data
Feb. 28, 1970 Spain .................................. 377,036

[52] U.S. Cl. .................... 156/71, 156/242, 264/45, 264/48
[51] Int. Cl. ........................ B32b 31/06, B32b 31/12
[58] Field of Search ....................... 156/77, 78, 242; 264/45, 48, 53

[56] References Cited
UNITED STATES PATENTS
3,159,514  12/1964  McKnight ............................ 264/45
3,410,931  11/1968  Johnson ............................... 264/45
3,371,053  2/1968   Raskin ................................. 264/53

Primary Examiner—Benjamin A. Borchelt
Assistant Examiner—J. V. Doramus
Attorney—Wenderoth, Lind and Ponack

[57] ABSTRACT

Apparatus for discontinuously manufacturing a thermally insulated sandwich type building panel and method of fabricating it. The composite panel has two outer pre-formed planar shells with marginal transverse flanges having a small part thereof returned generally to define a further marginal co-planar flange on each which is generally parallel to the main plane of the basic planar shells. The two shells preferably have their inner surfaces pretreated to give a better bond with the plastic, and are supported in a manner with the open cavities and marginal co-planar flanges in face to face relation by one being moved into superposed relation to the other by suitable support and conveying apparatus. The supports to reenforcingly hold the shells are such as to permit the shells to be expanded apart only to a predetermined extent responsive to a previously introduced reactive plastic material into the lower shell, which plastic expands when subjected to heat. Accordingly, a unitary building panel is evolved which embodies a thermal and accoustical core or nucleus which also thermally separates the metallic exterior panels from one another to ultimately provide a building having improved thermal resistant and accoustical characteristics.

5 Claims, 14 Drawing Figures

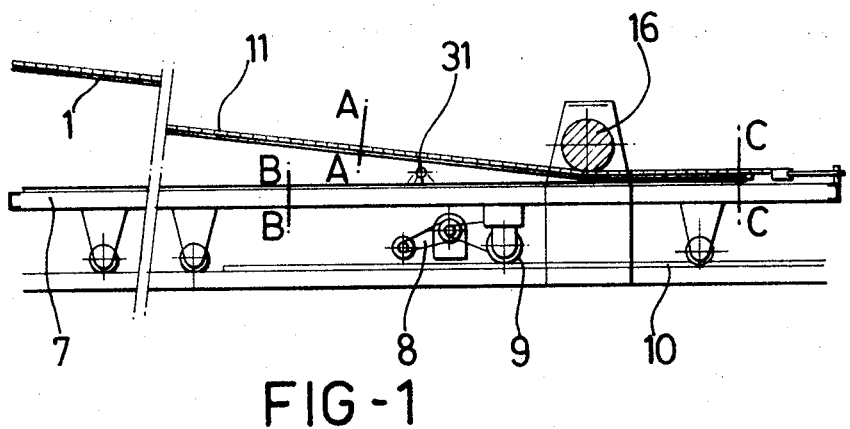
FIG-1
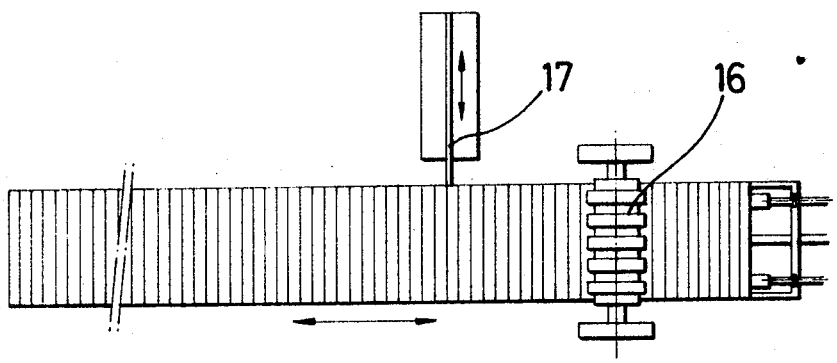
FIG-2
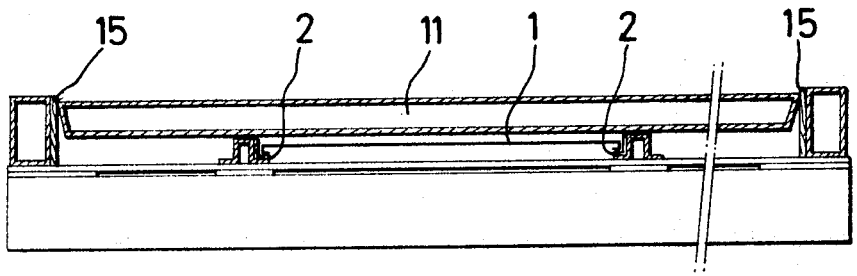
A-A    FIG-3

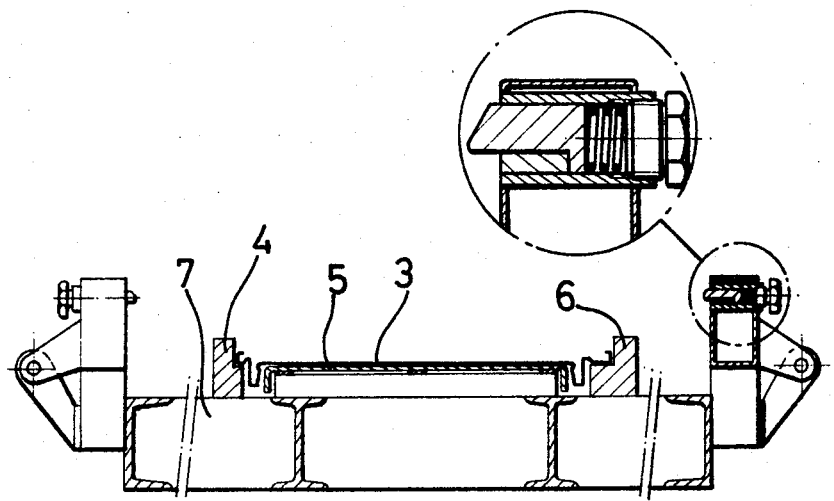
B-B   FIG-4
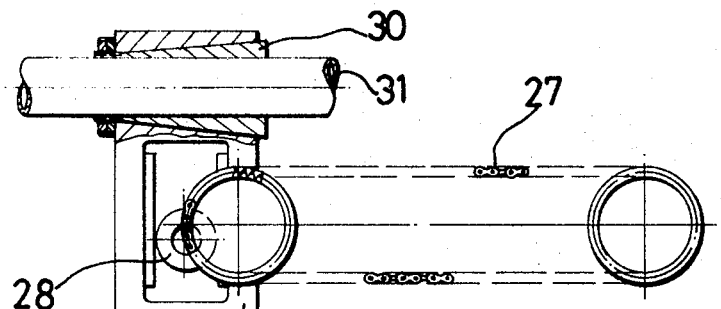
FIG-5
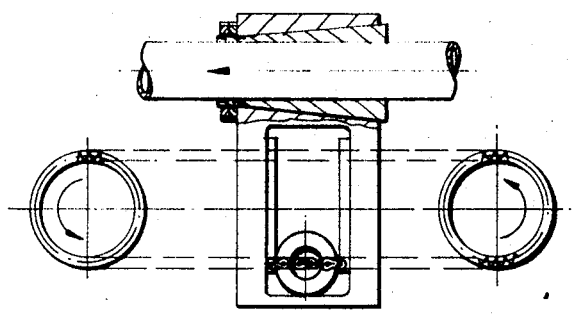
FIG-6

Javier VIDAL SARIO,
Inventor

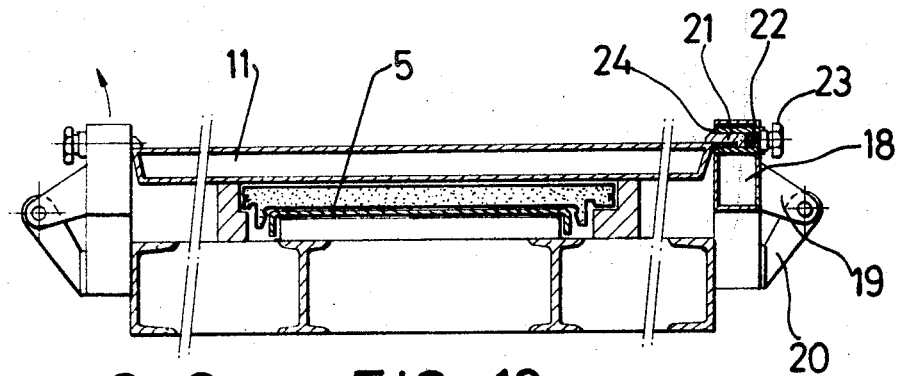
C-C  FIG-10
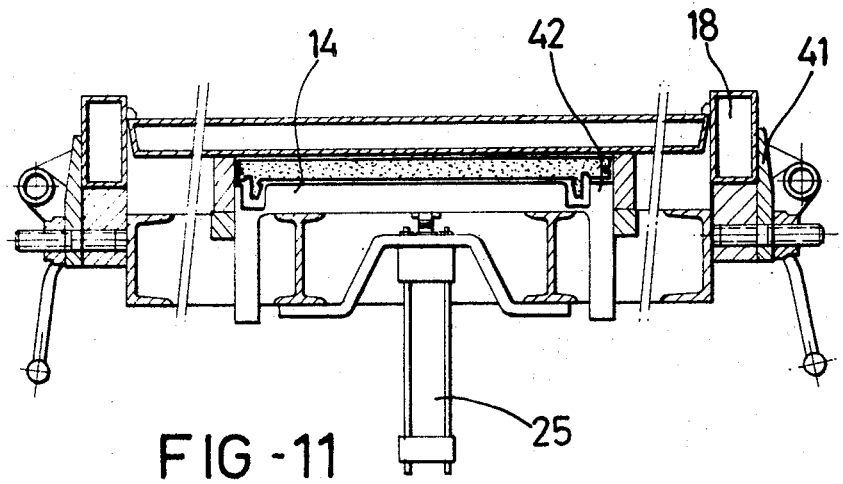
FIG-11
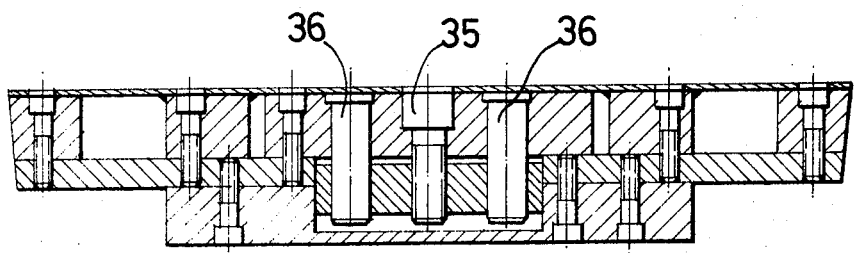
FIG-12

METHOD FOR THE MANUFACTURE OF THERMALLY INSULATED SANDWICH TYPE BUILDING

Very recently the known systems utilized for closures of roofs and facades have been augmented by the appearance of a new system based on the invention of an especially suitable prefabricated building section or element.

The element so evolved consists of a panel constituted by a mass of expanded plastic sandwiched between two metal profiles or shells that hold it in place, one of the more attractive characteristics thereof residing in the fact that the said metallic profiles do not make contact with one another, and thereby avoid the formation of a thermal bridge between them which would give rise to the transmission of heat from one to the other by conduction. The expanded plastic should be a good thermal and/or accoustic insulator, and the enveloping profiles should be of steel, which may either be covered with plastic or can be painted with lacquer.

The present invention takes on the concrete form of a process in accordance with which it is possible to mass produce this type of panel using manufacturing apparatus whose costs of purchase and of maintenance are low.

An important object of the process is to provide a thermal insulated bridge between the enveloping profiles constituted by the same expanded plastic material which is used as the nucleus of the panel.

In accordance with what has been stated above, the process requires that the two profiles which are to constitute the exterior of the panel, which profiles have been previously formed in an independent plant, be situated with their cavities face-to-face in such a manner that, before they are completely super-imposed, the plastic material is deposited on the lower profile in an evenly distributed manner, which plastic material subsequently is subjected to the action of heat to become expanded to interlock the two profiles or shells together.

The process likewise requires that the inner surfaces of the profiles to have been treated with paint in order to facilitate the adherence of the plastic; and also that at the moment when the expansion of the said plastic occurs, the disposition of the two profiles which have been perfectly superimposed and held in immoveable positions on rigid supports forming essentially the same configuration as the profiles is such as to be sufficient to resist the expansion pressure of the said plastic material without producing distortion or unduly increasing the distance between the profiles beyond a predetermined desired amount.

Lastly, the process includes a phase of expulsion of the finished panels, and the whole process is carried out with the aid of apparatus which makes possible the orderly completion of all its phases under optimum conditions.

A more detailed description of the process and of the installation in which it is carried out is given below with the aid of the annexed illustrative drawings in which the different figures reproduced correspond to the following concepts:

FIG. 1 is a longitudinal elevational schematic arrangement of the installation in working order;

FIG. 2 is a plan view of the installation corresponding to the device shown in FIG. 1;

FIG. 3 is a cross-section taken substantially through the line 3—3 of FIG. 1;

FIG. 4 is a cross-section taken substantially through the line 4—4 of FIG. 1;

FIGS. 5, 6 and 7 are semi-schematic details of alternative means of operation of the nozzle that pulverizes the plastic material to be expanded on the panel showing different functional positions;

FIG. 10 is a diagrammatic cross-section taken substantially on line 10—10 of FIG. 1, and in it there may be seen the panel which has been constituted and the superposed shell elements that contribute to its formation;

FIG. 11 is a view similar to FIG. 10 and represents a cross-section of the platform showing the device for expulsion of the panel;

FIG. 12 is an enlarged cross-section of the clamp which affixes the upper profile to the chain forming part of a profile-conveying means and which section is taken through the width of the link.

Figure 7:
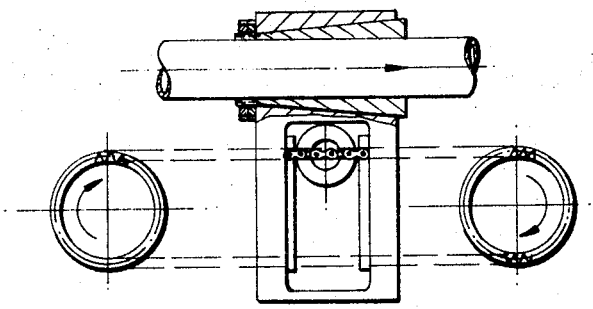
Figure 8:
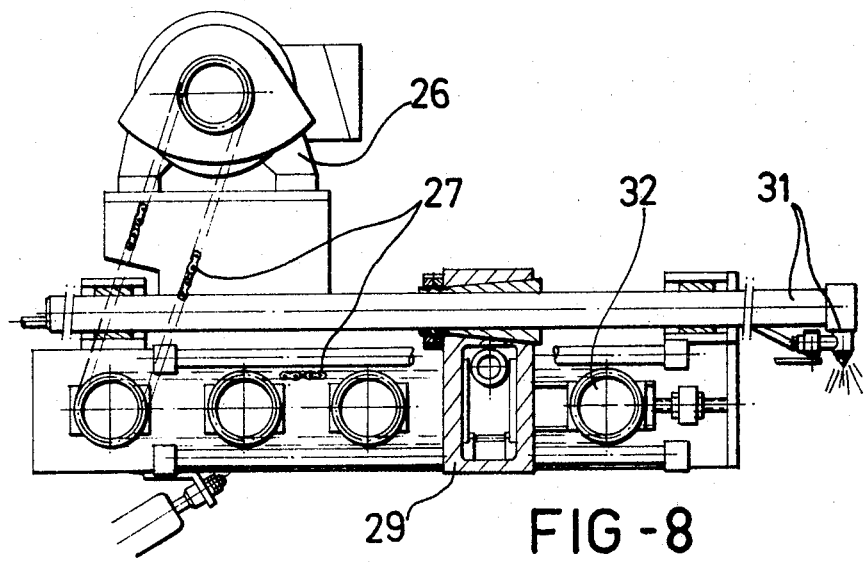
FIG. 8 is a further semi-schematic section of the whole of the device that operates the pulverizing nozzle.

In a fundamental manner, and as may be appreciated in its overall aspect, in FIGS. 1–4 the installation comprises a platform 7 upon which supporting pieces 4, 5 and 6 (FIGS. 4 and 10) have been provided, and arranged to correspond in shape not only with that of the lower profile 3 which is going to be supported on them, but also to correspond with or to receivingly support both profiles in their superimposed condition with the plastic material having been deposited and expanded between them (see FIG. 10).

The said platform 7 is constructed so as to have movement in both direction corresponding to its longitudinal axis, and at one end thereof has attaching means for connecting an end of chain 11 comprised of flat links. The flat links have a cross-section in the form of an inverted isosceles trapezoid, and are a width almost equal to that of the platform 7 and considerably greater than that of the panel that is to be formed. The chain 11 at one end is connected to the said platform by means of a sliding or adjustable take-up device seen in detail in FIG. 9, and as a result of which the said platform, when it is caused to move in either of its two directions can travel a short space which has been precalculated, and can be adjusted before commencing to drag the chain.

The chain 11, for its part, is supportingly disposed on rails 2 placed in an inclined manner and converges onto the platform, with respect to the direction of travel. Said rails are interrupted or terminated a little before the point of interception with the platform 7 in order to permit the said chain to be supported directly on the platform when it slides forward when dragged by the said platform.

As seen in FIG. 3, each of said rails 2 has a lower flanged portion which provide a lower plane, and the top surfaces of which provide an upper plane which serves to support the said chain, and the former supports the upper shell or profile 1 constituting one face of the panel. Shell member 1 is attached at its front to the chain, to be described in more detail hereinafter, and is thus pulled by the latter by means of a clamp 13 of special design, which may be seen in FIG. 9.

The chain 11 is supported on the platform 7 when it leaves the inclined rails by means of laterally spaced complementary elongated supports 4 and 6 on which the lower profile 3 is supportingly disposed. Between said supports 4 and 6, and in such a manner that it is supported on the aforementioned lower profile 3, the upper profile 1, which is fixed to be advanced by the chain 11, is then slidingly superimposed upon the lower profile 3, so that the open cavities of each profile or shell member are face to face.

From the moment in which the two profiles 1 and 3, constituting the external part of the panel, are superimposed, the chain 11, by means of a pressure roller 16 interposed in its travel, is pushed downward and forced to become housed under catches (c) fitted on the lateral parts of the moveable platform 7 (see FIG. 10), which said catches (c) prevent the chain 11 from becoming separated from the supports 4 and 6 that already hold the profile 3.

The purpose of this is to withstand the pressure generated by the subsequently heated and expanding plastic material of the core, which material has been pulverized in a uniform manner over the lower profile 3 prior to the upper profile 1 becoming super-imposed on the latter, and which plastic only begins to expand as a consequence of being subjected to the action of heat. The clamps (c) assure that the pressure will not lift the chain 11, which otherwise would permit the upper profile 1 to become excessively and irregularly separated from the lower profile 3. Also, it is important to stress that the collective height of the two profiles 1 and 3 is slightly less than that of the supports 4 and 6 that receive them, and upon which the chain rests. Between the upper profile 1 and the under surface of the chain, there is a short space through which the last-mentioned profile 1 travels responsive to the pressure of the plastic undergoing expansion, thereby becoming slightly separated from the lower profile 3 and whereby the small resulting space between the separated profiles becomes filled by the plastic itself, thus creating an insulation between both profiles to thereby create a thermal barrier to prevent transfer of heat from one profile to the other. Having explained the process in general terms, and the fundamental characteristics that the installation must have so that its different phases may be completed, a more detailed description follows referring to each and every one of the figures represented in the attached set of plans.

In accordance with FIGS. 1–3 and 4, a preformed upper profile 1, which has the surface which will be in contact with the insulating material impregnated with paint to facilitate the adherence of the plastic material, is deposited on the rails 2 situated in an inclined position and converging on the platform with respect to the direction of movement.

The lower profile 3 (FIG. 4) also pre-formed and pre-painted or coated in a similar manner to the upper profile, is also deposited on the support means or bed constituted essentially by the pieces 4, 5 and 6, which extend along the whole length of the platform 7. Said bed or support pieces collectively essentially have the same overall shape as the profile, in order to preclude the lower profile 3 from suffering distortions resulting from the pressure excercised upon it by the plastic material while undergoing thermal expansion.

This platform 7 (FIG. 1) is self-propelled by a reversible motor group 8 constituted by a variable-speed motor whose speed can be adjusted, and which transmits its power to a toothed pinion-like wheel 9 which meshes with a rack 10 arranged along the whole length of the installation, making it possible for the platform to move in both directions.

The platform 7 is also fitted with a built-in heating system which includes suitable orifices provided in the surface which is in contact with the profile to heat the profile or shell member to effect expansion of and perfect adherence by the insulating material with said shells or profiles.

The chain 11 of the device is horizontally articulated and of the same width as the platform. The chain 11 is fixed at one end to the anterior part of the platform by means of the double sliding device 12 (see FIG. 9), in order to not only permit it to commence forward travel after the platform and to compensate for any initial phase difference which may have evolved in the arranging of the two profiles, but also to facilitate the attachment of the upper profile 1 to the clamp 13 and the placing of the clamp in an advanced position with respect to the device 31 for dispensing the pulverized chemical product.

The platform moves forward for a predetermined length that is required in accordance with the dimension of the particular size panel being made.

In the most advanced position, it is kept motionless for some minutes in order to permit the complete setting of the expandable material so that subsequent distortions will not be produced. The clamp 13 is provided with a movable jaw 39 which is then opened, and the upper profile 1 is freed with respect to the articulated chain, and consequently the finished panel P is also free. The platform 7 is then caused to retrocede and it traverses the space A (FIG. 9), carrying the panel P along with it before the articulated chain 11 begins to move, which it will do when the nuts 33 and 34 make contact.

It is clear that the panel P, when it has been completely formed, rests on the platform 7, and the articulated chain 11 no longer fulfills any function.

Figure 9:
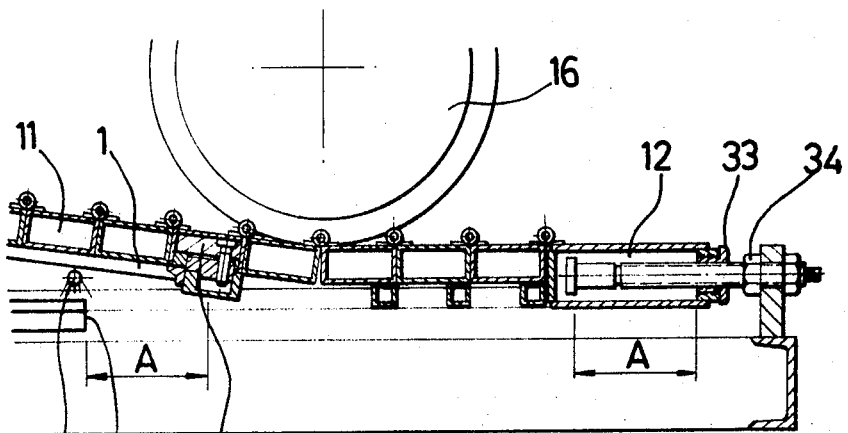
FIG. 9 is a cross-sectional detail showing the initial position of the profiles in the installation, the clamp system that holds the upper profiles, and the sliding mechanism which holds the chain to which the said upper profile provides anchorage on a platform on which the lower profile is disposed.

The nut 33 shown in FIG. 9 is not threaded on its interior diameter so as to permit the spindle to move freely. The threaded part of the spindle provides adjustment means for space A, if necessary, by being rotatably threaded to a greater or lesser extent relative to the upright support 7a fixed to said platform 7.

The chain 11 rests freely upon the upper surface of the inclined rail 2 which carries the upper profile 1 (see FIG. 3), and on a higher plane than the latter, so that the weight of the chain 11 is supported by the rails 2 and not by the profile 1.

The lateral guiding of the chain 11 is ensured by means of the guide pieces 15 (FIG. 3) made of material that permits an easy sliding action by the chain links, and which constitutes part of the whole of the apparatus.

In a position adjacent the laterally outward sides of the chain, and forming part of the latter as a link, the clamp 13 system is arranged, which is controlled from the exterior of the link proper, for the purpose of detachably fixing the upper profile 1 to the chain during its forward movement, and with the said profile becoming disconnected and free during the backward movement (see FIG. 9).

Figure 13:
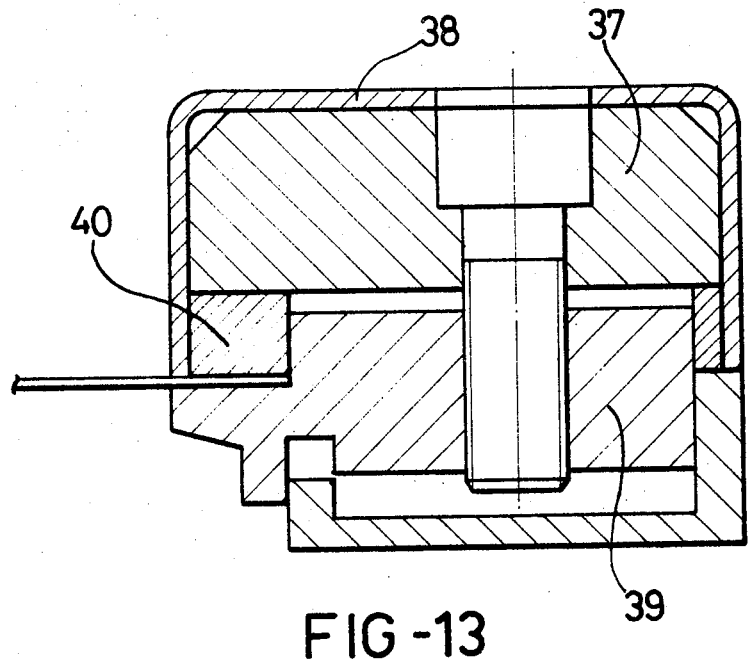
FIGS. 13 and 14 are enlarged cross-sectional details of the same clamp shown in, respectively, closed and open operative positions.
Figure 14:
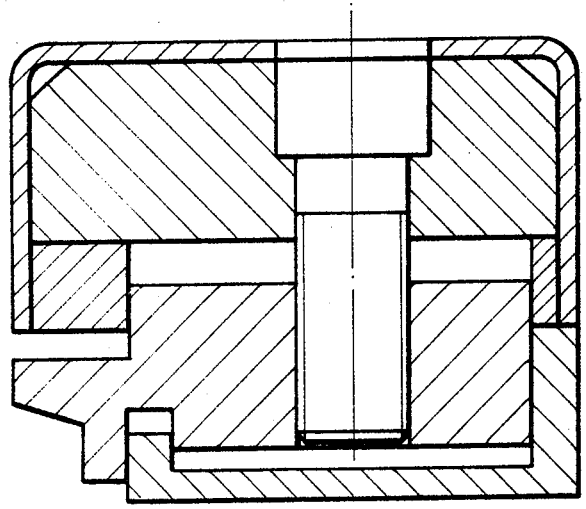

The functioning may be deduced from FIGS. 12, 13 and 14 in which it is shown that a particular link of the chain is constituted by a U-shaped profile 38 which has housed in its interior and rigidly fixed to it a rectangular piece 37 and opposed thereto a corresponding movable jaw or lower piece 39. The jaw piece 39 is guided by a pair of spaced rods 36 disposed in part 37, and is movably connected to piece 39 by the screw 35. Said screw, depending upon whether it is turned to the right or to the left, will cause the jaw piece 39 to approach or recede from the piece 37, and consequently to approach or recede from the fixed piece 40 against which the profile is clamped in position.

There also forms part of the system a distributing pipe 31 which distributes the expandable plastic product over the lower profile (see FIGS. 1 and 5-9).

The device 31 distributes the pulverized chemical product, and is also endowed with an alternating linear movement to enable it to move at right angles to the direction of forward movement, so that the pulverized product is projected onto the profile 3 while following a zig-zag line, the spacing of which is adjusted in accordance with the rhythm of this device and that of linear forward movement of said profile.

The plastic distributing mechanism further comprises (FIG. 8) a direct current motor group with a static generator 26 which operates a double endless chain 27. In one of the chain links there is solidly fixed a bearing 28 (FIG. 5) which freely oscillates by sliding upwards or downwards within piece 29 to impart to the latter an alternating linear movement. A conical sleeve with a nut 30 adjustably holds a distributing tube 31 which terminates in a nozzle 31a, through which tube 31 there are transported to said nozzle 31a the chemical products to be pulverized and are transported therein by compressed air.

The movement of the nozzle 31a can be adjusted by means of a sleeve-nut device 32 (FIG. 8) incorporated into the complex, which limits the forward movement.

The device for adjusting or limiting the travel of the nozzle is only used when the width of the panel to be constructed is varied. In view of the fact that this is not frequent and is envisaged only as a possibility, the adjustment of the device is made by hand and the length of the chain is correspondingly adjusted in each case.

The chain 11, which becomes deposited on the platform 7, dragged by the forward movement of the latter, is supported intermediately on the pieces 4 and 6 on a height appropriate to the thickness of the finished panel P, and support pieces 4 and 6 are disposed near opposite sides and along the whole length of the platform 7 so that between the surface of the platform intermediate piece 5 and the lower surface of the chain 11 there is established a predetermined space which corresponds to the form and dimensions that it is desired to be obtained in the finished panel P (see FIG. 10). During the heating of the plastic heating phase, the upper profile 1 and the chain are raised upwards by the expansive reaction of the chemical product which generates considerable energy during such expansion phase.

For the purpose of limiting this upward movement of the chain and to ensure that between the latter and the platform, and consequently between the two profiles, there is provided the exact space corresponding to the thickness of the finished panel, suitable means are arranged on both sides and longitudinally with respect to the platform, said means comprising tubular members 18 which are joined to the platform 7 by means of the hinged elements 19 and 20, which allow said tubular members 18 to tilt and to be placed in a working or withdrawn position (FIG. 10), when some retaining pieces 41 (FIG. 11) are brought into service. These pieces 41 are simple articulated checks, capable of being fixed vertically or horizontally by means of a threaded rod 41a fixed to the platform, which acts in opposition to the action of the hinged elements 19 and 20.

Said tubular members 18, in their working position, are situated on both sides of the chain 11 and are higher than the latter so that said chain is held between both pairs of tubular members 18. A plurality of orifices are suitably spaced along the whole length of members 18 to cooperatively receive the clamps C (see FIG. 4, enlarged detail portion). The clamps C comprise metallic rods 21 which are slidably mounted in the orifices, and of which said rods have one end part protruding from the member 18 toward a corresponding rod part at the opposite side of the support. Each rod is biased against an abutment by the cooperative action of a spring 22, the tension of which is adjustable by the nut 23 cooperating with sleeve 24. The projecting ends of the rods 21 facilitate the correct holding position of the chain 11 and hold the latter down when the expansion of the chemical product tends to lift it.

Incidentally, the device for introducing the plastic material may comprise a nozzle 31a, which embodies means for effecting the pulverizing of the plastic material, or may be of a special alloy steel to facilitate interiorly intermixing of different chemical products dispatched from their respective containers by high-pressure pumps, which pressure, overcoming a system of pistons and springs arranged inside the nozzle and pulverizes the mixture by means of an atomizing nozzle.

After the panel P has fully set, and when it is no longer subject to dimensional distortions, steps are taken to withdraw it after the retaining pieces 41 have been withdrawn, by tilting the tubular members 18 with the system of retaining catches, and by imparting to the platform a receding movement and raising the chain via the ramp of rails 2.

In a convenient location, immediately following or adjacent the device 31 that distributes the chemical product (see FIGS. 1, 2 and 9), there is provided a roller means 16 supported on a double frame. The roller means is provided with a semi-elastic covering material and extends laterally across the whole width of the chain 11, which situated tangentially on the latter at its interception with the platform, produces pressure on the chain and compels the chain to enter the system of retention described hereinabove.

Finally, the platform has incorporated in it a system for the expulsion of the completed panel which in the final phase of the cycle is extracted from its bed by means of the supporting pieces 42 which are situated uninterruptedly along the platform and are operated by the pneumatic cylinders 25 (see FIG. 11) in a conventional manner to withdraw the panel.

Accordingly, it is apparent from the foregoing description that an improved panel article and apparatus and method for making same has been evolved which achieves the objectives and advantages referred to in the specification preamble portions and which also lends itself to manufacturing in a discontinuous manner. Reference should be made to the appended claims for a determination of the scope of the defined subject matter.

I claim:

1. A process for the noncontinuous manufacture of individual sandwich-type thermally insulated faced building panels applicable for uses including roofing closures and facades, which process comprises:
   a. placing a first preformed shell-like profile with the open face thereof positioned upwardly on a generally horizontal reciprocable supporting platform;
   b. supporting a second preformed shell-like profile spaced above said first profile, the open face of said second profile being positioned downwardly;
   c. moving said first and second profiles into generally superimposed relation with the open sides thereof in face-to-face position by
      1. reciprocating said supporting platform in a first direction, thereby moving said first profile in said direction, and
      2. simultaneously moving said second profile in a downwardly inclined manner toward said first profile, thereby superimposing said first and second profiles at a predetermined position;
   d. introducing a heat reactive, expansible pulverized mass of plastic material into and to uniformly cover said first profile before the completed advancement of said second profile to said predetermined superimposed position, which plastic material is to constitute the thermal insulation core of said sandwich panel;
   e. supporting said superimposed profiles by devices at their sides to preclude shifting in the lateral direction, and supporting said profiles from below and above by rigid support means which will maintain the preformed shapes of said profiles, but in a manner which will permit to a limited predetermined extent an opposite movement of said profiles away from one another responsive to the heat-reactive expansion of said pulverized plastic material therebetween;
   f. subsequently subjecting said superimposed plastic material-filled profiles to a predetermined amount of heat and maintaining said profiles and plastic material stationary for a predetermined time period to effect expansive reaction and setting of said plastic material to effect bonding thereof to said opposed profiles, thereby expansively separating said profiles to said limited predetermined extent against their respective below and above supports, whereby said expanding plastic fills the open space between said profiles and forms an intermediate insu'ating barrier to physically separate the edges of said profiles from contact with one another; thus forming a finished building panel; and
   g. thereafter reciprocating said supporting platform in a direction opposite to said first direction, thereby removing said finished building panel from said supporting means.

2. A process as defined in claim 1, further including using profiles preformed to have marginal flange portions and superimposing said profiles with said marginal flange portions directed toward the other, so that said bonding together of said profiles by the expanding plastic includes the interlocking of said expanding plastic material with said marginal flange portions.

3. A process as defined in claim 1, further including pretreating the inside face-to-face surfaces of said shell-like profiles, before commencing the placement thereof in the superimposed manner with a chemical reactive liquid to enhance the bonding of said thermal insulation plastic core material during its heat reactive expansion stage.

4. A process as defined in claim 1, further including subjecting the pretreated facing surfaces of said profiles to heat to better activate adherence of said chemical reactive liquid and said pulverized plastic material.

5. A process as defined in claim 3, including also applying a protective finish to the external surfaces of said shell profiles.

* * * * *